United States Patent [19]
Nishide

[11] Patent Number: 5,794,978
[45] Date of Patent: Aug. 18, 1998

[54] RETURN PREVENTING DEVICE AND BUCKLE PULL-OUT PREVENTING DEVICE

[75] Inventor: Seiji Nishide, Aichi-ken, Japan

[73] Assignee: Kabushiki Kaisha Tokai-Rika-Denki-Seisakusho, Aichi-ken, Japan

[21] Appl. No.: 580,851

[22] Filed: Dec. 29, 1995

[30] Foreign Application Priority Data

Jan. 27, 1995 [JP] Japan ................... 7-011982

[51] Int. Cl.$^6$ ................... B60R 22/46; F16D 41/12
[52] U.S. Cl. ................... 280/806; 74/577 M; 188/82.7; 297/480
[58] Field of Search ................... 280/806; 297/480, 297/479; 74/577 M, 577 R; 242/374, 384.2; 188/82.7, 82.74, 82.77

[56] References Cited

U.S. PATENT DOCUMENTS 4,029,267  6/1977  Slipper ................... 74/577 M

FOREIGN PATENT DOCUMENTS

| 943417 | 3/1949 | France ................... 74/577 R |
|---|---|---|
| 40 32 829 | 5/1991 | Germany ................... 280/806 |
| 6-270762 | 9/1994 | Japan ................... 280/806 |
| 2244203 | 11/1991 | United Kingdom ................... 280/806 |
| 2262701 | 6/1993 | United Kingdom . |
| 85/04628 | 10/1985 | WIPO . |
| 85/04629 | 10/1985 | WIPO . |

*Primary Examiner*—Peter C. English
*Attorney, Agent, or Firm*—Sixbey Friedman Leedom & Ferguson; Thomas W. Cole

[57] ABSTRACT

A return preventing device preventing return of an object driven when a vehicle suddenly decelerates includes: a gear receiving drive force of a drive device, which drives the object, so as to rotate in a first direction, and transmitting the drive force to the object so as to drive the object; a rotation-preventing pawl disposed so as to be meshable with the gear, and preventing rotation of the gear in a second direction opposite the first direction in a state in which the rotation-preventing pawl and the gear are meshed; and an elastic member for making the rotation-preventing pawl mesh with the gear substantially synchronously with rotation of the gear in the second direction. Accordingly, the rotation-preventing pawl reliably meshes with the gear substantially synchronously with rotation of the gear in the second direction.

9 Claims, 7 Drawing Sheets

RETURN PREVENTING DEVICE AND BUCKLE PULL-OUT PREVENTING DEVICE

BACKGROUND OF THE INVENTION

1. Field of the Invention

The present invention relates to an object pull-in device for pulling-in an object such as a buckle or the like when a vehicle suddenly decelerates, and in particular, relates to a return preventing device which prevents the returning of an object which is driven when a vehicle suddenly decelerates.

2. Description of the Related Art

A vehicle seat belt system is generally structured as illustrated in FIG. 7. This structure may be summarized as follows. A seat belt system 60 is equipped with a webbing retractor 53 which is provided at the lower portion of a vehicle so as to correspond to a seat 50. One end of a webbing 51 engages with the webbing retractor 53. The webbing 51 is urged in a taking-up direction by an urging means such as a spring or the like provided within the webbing retractor 53, but the webbing 51 is able to be pulled-out. The other end of the webbing 51 passes through a through-hole of a shoulder anchor 55 disposed at an upper portion of the vehicle so as to correspond to the webbing retractor 53, and is engaged in a vicinity of the webbing retractor 53. A tongue plate 52 is held at the webbing 51 so as to be movable in the longitudinal direction of the webbing 51. A buckle device 54 is disposed at a substantially central portion of the vehicle in the transverse direction thereof.

Accordingly, when a vehicle occupant sits on the seat 50 and engages the tongue plate 52 with the buckle device 54, the webbing 51A, 51B is in an applied state in which it is applied to the vehicle occupant. In this applied state, the portion of the webbing 51A from the tongue plate 52 to the shoulder anchor 55 corresponds to the shoulder portion of the vehicle occupant and is called the shoulder webbing, whereas the portion of the webbing 51B from the tongue plate 52 to the other end of the webbing 51 corresponds to the hip portion of the vehicle occupant and is called the hip webbing. When the vehicle suddenly decelerates, a lock mechanism within the retractor 53 is operated, and the webbing 51 is prevented from being pulled-out. There is known a buckle pull-in device called an inner pretensioner which serves as a means for tightly applying the webbing 51A, 51B to the vehicle occupant and which pulls-in the buckle 54, which is engaged with the tongue plate 52, in a downward direction.

A buckle pull-out preventing device 99 illustrated in FIG. 5 is used in an inner pretensioner as a return preventing device for the buckle 54. In the return preventing/pull-out preventing device 99, a gear 100 is connected to a pulley (unillustrated) around which is trained a wire (unillustrated) for driving the buckle 54 when the vehicle suddenly decelerates. Teeth 201 of a pawl 200 are urged by a torsion coil spring 300 in the direction of engaging with gear teeth 101 of the gear 100.

When the wire is pulled-in by an unillustrated wire tension applying means at the time of sudden deceleration of the vehicle, because the gear 100 rotates clockwise in FIG. 5, the pawl 200 is pushed upward by the rotation of the gear 100, i.e., by the gear teeth 101, so as to assume the state illustrated in FIG. 6. Due to the urging force of the tension coil spring 300, the pawl 200 meshes with the next teeth of the gear 100. The above operations are repeated by further rotation of the gear 100. Because returning of the buckle 54 is prevented by the engagement of the gear 100 and the pawl 200, the gear 100 rotates and the buckle 54 is pulled in. In this way, slack in the webbing 51 is eliminated via the tongue plate 52 which is engaged with the buckle 54 illustrated in FIG. 7, and the webbing 51 is applied tightly to the vehicle occupant.

In the above-described conventional buckle pull-out preventing device 99, time is required for the pawl 200 to move from the state in which it has been pushed upward by the gear 100 to the state in which the pawl 200 is meshed with (locked with) the gear 100. Further, there are cases in which the phases of the teeth 201 of the pawl 200 and the gear teeth 101 of the gear 100 do not match, and the teeth 201 and the gear teeth 101 collide such that skipping of teeth occurs.

SUMMARY OF THE INVENTION

In view of the aforementioned, an object of the present invention is to provide a return preventing device in which engagement of a pawl and a gear can be effected swiftly and reliably.

A first aspect of the present invention is a return preventing device preventing return of an object driven when a vehicle suddenly decelerates. The return preventing device includes: a gear receiving drive force of a drive device, which drives the object, so as to rotate in a first direction, and transmitting the drive force to the object so as to drive the object; a rotation-preventing pawl disposed so as to be meshable with the gear, and preventing rotation of the gear in a second direction opposite the first direction in a state in which the rotation-preventing pawl and the gear are meshed; and synchronizing means for making the rotation-preventing pawl mesh with the gear substantially synchronously with rotation of the gear in the second direction.

In accordance with the above-described first aspect, due to the drive force of the drive device when the vehicle suddenly decelerates, the gear is rotated in the first direction and drives the object. Next, when the gear receives tensile force from the object, the gear attempts to rotate in the second direction. At this time, the synchronizing means makes the rotation-preventing pawl mesh with the gear substantially synchronously with the rotation of the gear in the second direction, so that rotation of the gear in the second direction is prevented. In this way, returning of the object is reliably prevented.

The synchronizing means may include, for example, an elastic member which engages the teeth surfaces of the gear and makes the pawl mesh with the teeth of the gear due to the rotation of the gear in the second direction. In the embodiment which will be described hereinafter, a plate spring is used as the elastic member.

A second aspect of the present invention is a return preventing device preventing return, in an opposite direction, of an object driven when a vehicle suddenly decelerates. The return preventing device includes: a rotating body rotatable in a first direction and in a second direction opposite to the first direction, the rotating body receiving drive force of a drive device, which drives the object, such that the rotating body is rotated in the first direction, and the rotating body transmitting the drive force to the object so as to drive the object; a gear held at the rotating body and rotating integrally with the rotating body; a rotation-preventing pawl disposed so as to correspond to the gear, and meshable with the gear by pivoting in a third direction, and preventing rotation of the rotating body in the second direction in a state in which the rotation-preventing pawl is meshed with the gear; and synchronizing means for pivoting the rotation-preventing pawl in the third direction so as to make the rotation-preventing pawl mesh with the gear, substantially synchronously with rotation of the rotating body in the second direction.

In the embodiment, the rotating body is a pulley which receives drive force from a drive device via a wire and is rotated thereby.

A third aspect of the present invention is a buckle pull-out preventing device installed in a buckle pull-in device for pulling-in a buckle when a vehicle suddenly decelerates, and preventing pulling-out of the buckle which has been pulled-in. The buckle pull-out preventing device includes: a rotating body rotatable in a first direction and in a second direction opposite to the first direction, the rotating body receiving drive force of a drive device, which provides drive force in a direction of pulling-in the buckle, so that the rotating body is rotated in the first direction and pulls-in the buckle; a gear held at the rotating body and rotating integrally with the rotating body; a rotation-preventing pawl disposed so as to correspond to the gear and so as to be meshable with the gear, the rotation-preventing pawl preventing rotation of the rotating body in the second direction in a state in which the rotation-preventing pawl and the gear are meshed; and synchronizing means for making the rotation-preventing pawl mesh with the gear substantially synchronously with rotation of the rotating body in the second direction.

The drive device may be, for example, a device which includes a piston connected to the aforementioned wire, and which drives the piston by gas pressure or the like.

The present invention may drive a seat belt buckle by drive force and apply tension to a webbing, or may directly pull the intermediate portion or the like of the webbing by drive force. In this case, the webbing is the object. Further, the object may be another vehicle part such as a seat or a pull-in type steering wheel or the like, provided that the part is an object which should be driven when the vehicle suddenly decelerates.

DESCRIPTION OF THE PREFERRED EMBODIMENT

Figure 1:
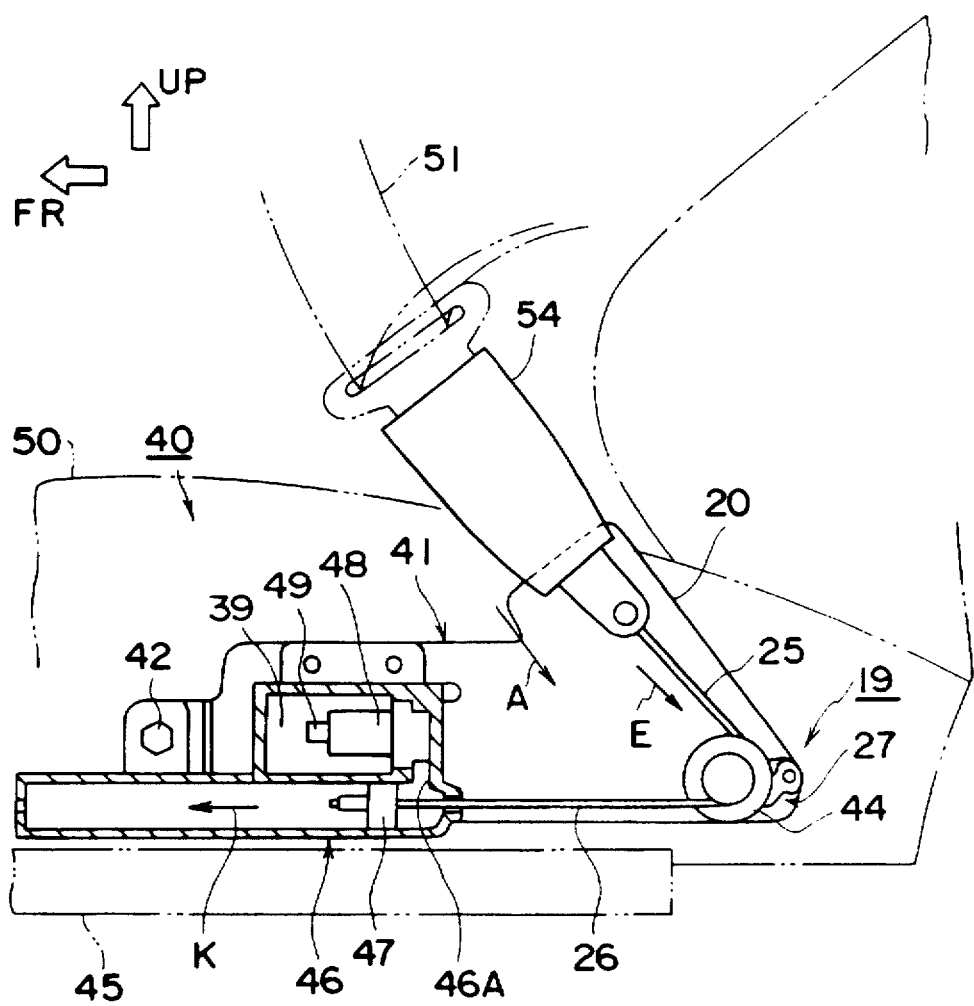
FIG. 1 is a schematic side view of a state in which a cover of a return preventing device relating to an embodiment of the present invention is removed.
Figure 2:
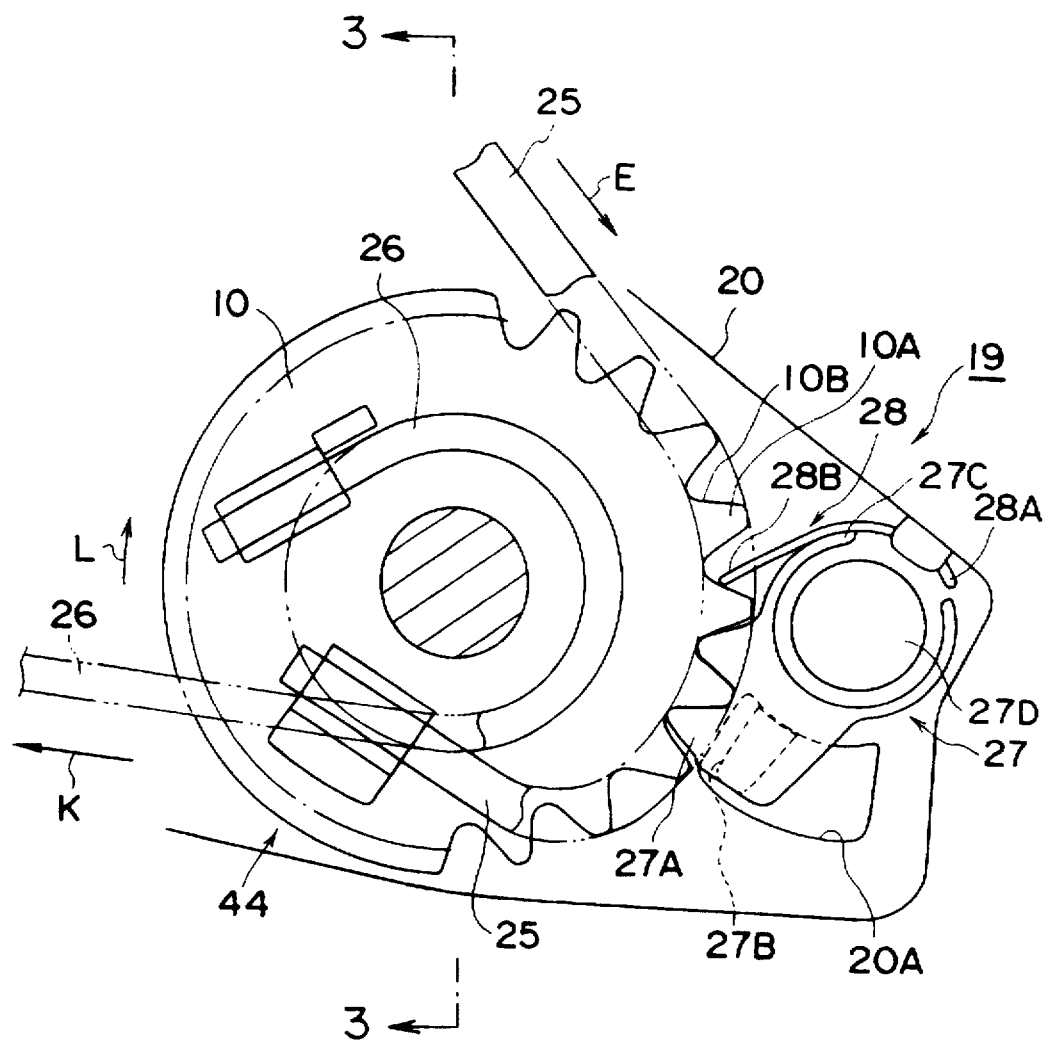
FIG. 2 is an enlarged side view illustrating a buckle pull-out preventing device of the return preventing device of the present invention.

Hereinafter, an embodiment of the present invention will be described on the basis of FIGS. 1 through 4. FIG. 1 is a schematic side view in which a cover relating to the embodiment of the present invention is removed. In FIG. 1, the arrow FR points toward the front of the vehicle, and the arrow UP points toward the top of the vehicle. FIG. 2 illustrates main portions of a buckle pull-out preventing device 19.

In FIG. 1, a main body portion 41 of a buckle pull-in device 40 is mounted by a mounting bolt 42 to a side surface of a seat 50 (illustrated by the two-dotted dash line in FIG. 1) which is supported at an unillustrated vehicle via seat rails 45 such that the position of the seat 50 in the longitudinal direction of the vehicle is adjustable.

Figure 3:
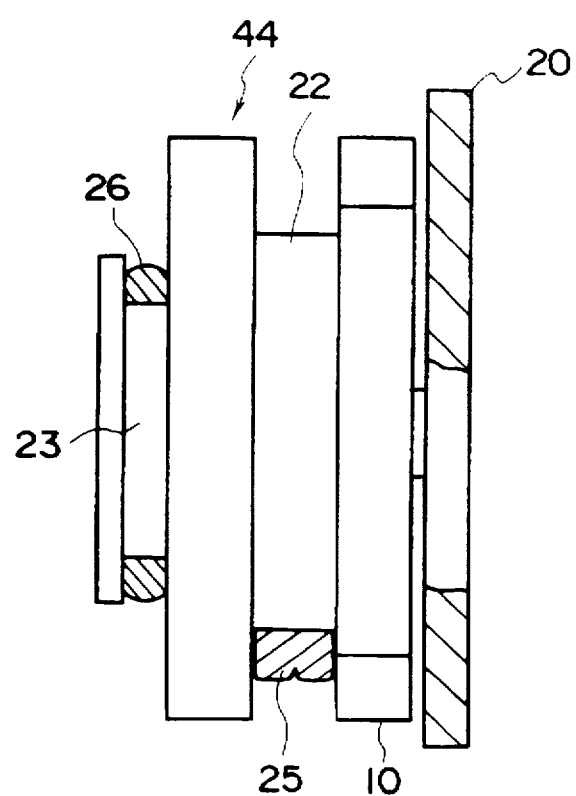
FIG. 3 is a sectional view taken along line 3—3 of FIG. 2.

A buckle 54 is held at the illustrated position, and is movable via a guiding structure (unillustrated) toward the bottom and rear of the vehicle (in the direction of arrow A in FIG. 1) due to a drive force of a predetermined amount or more. As illustrated in FIG. 1, one end portion of a first wire 25 is connected to the buckle 54. As illustrated in FIGS. 2 and 3, the other end portion of the first wire 25 is fixed to a pulley 44 which is an entraining body which is shaft-supported at a plate base 20 of the main body portion 41 and which is disposed at the end in the direction of pulling-in the buckle 54.

One end portion of a second wire 26 is fixed to the pulley 44. The other end portion of the wire 26 engages a piston 47 of a tension applying means (to be described later) which is disposed toward the front of the vehicle. The pulley 44 functions to convert the direction of the transmission of power of the wires 25, 26 from the sliding direction of the piston 47 which will be described later (the direction of arrow K) to the moving direction of the buckle 54 (the direction of arrow A).

As shown in FIG. 3, a gear 10, a first wire hitching groove 22, and a second wire hitching groove 23 are formed coaxially at the pulley 44 from the plate base 20 side.

As illustrated in FIGS. 1 and 2, a pawl 27, which is a portion of the buckle pull-out preventing device 19, is rotatably shaft-supported via a shaft 27D at the plate base 20 at the vehicle rear side of the gear 10. As shown in FIG. 2, two teeth 27A which mesh with gear teeth 10A of the gear 10 are formed continuously at the pawl 27.

An engaging projection 27B, which is illustrated by the broken line in FIG. 2 and which engages a guide groove 20A formed in the plate base 20, projects at the plate base 20 side of the pawl 27. The range of pivoting of the pawl 27 is limited by the engagement of the engaging projection 27B and the guide groove 20A.

Figure 4:
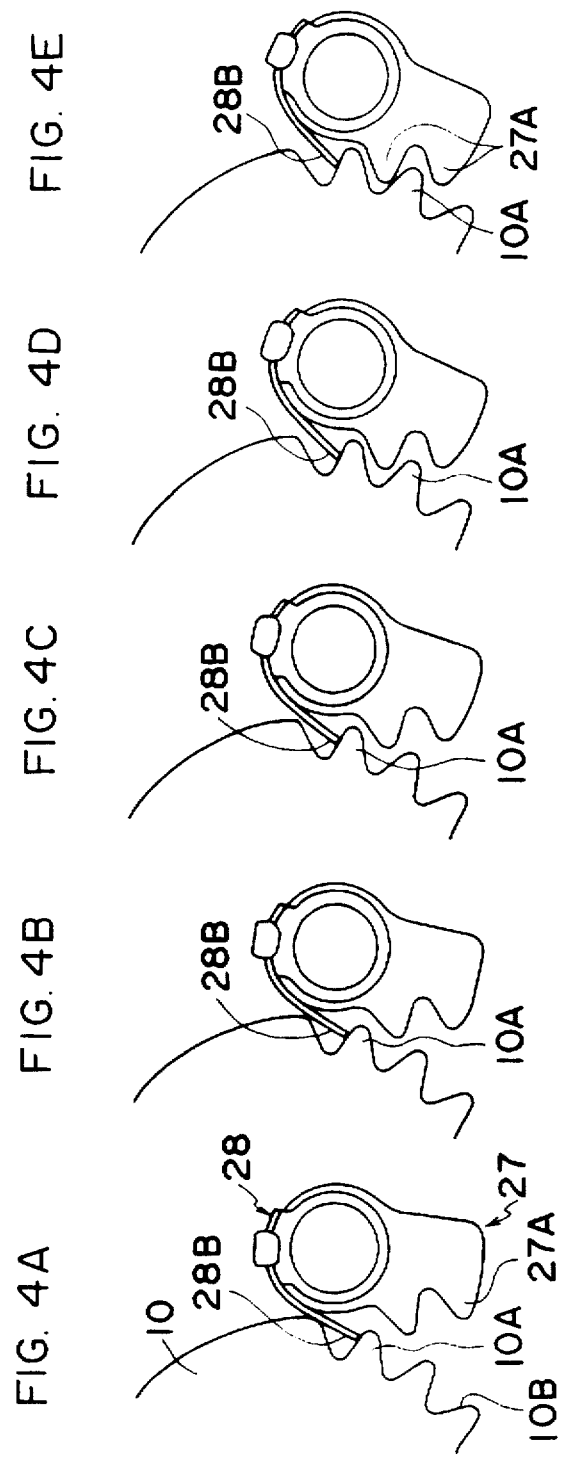
FIGS. 4A through 4E are operational views illustrating engaged states of a gear and a pawl of the present embodiment.
Figure 5:
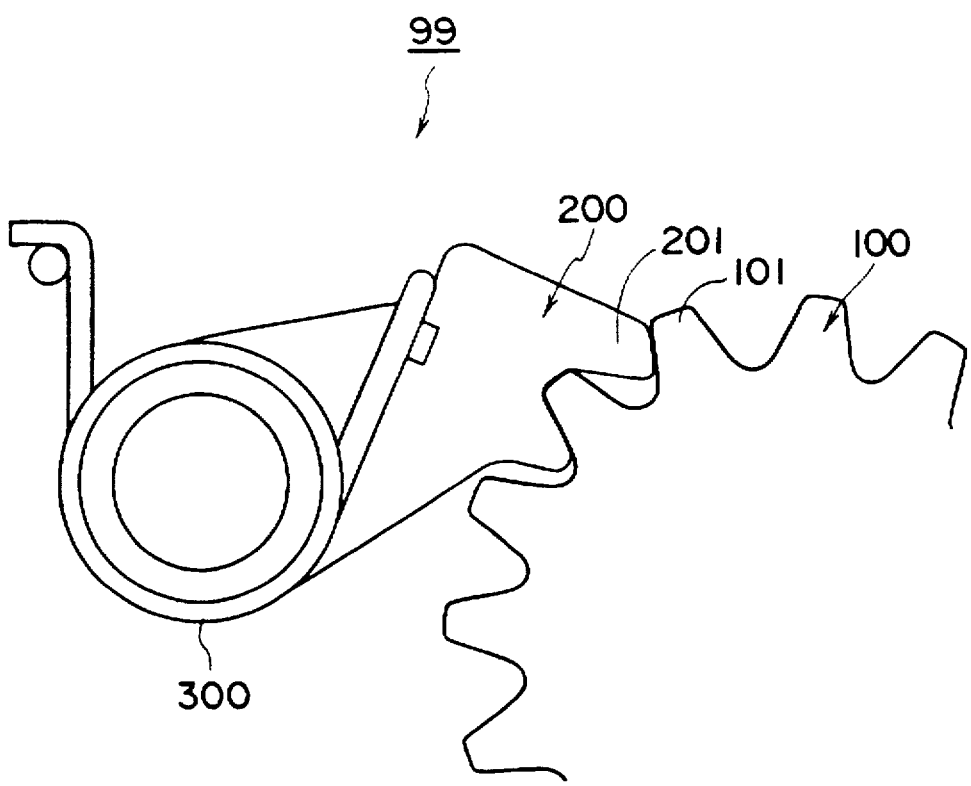
FIG. 5 is a side view corresponding to FIG. 2 and illustrating a conventional buckle pull-out device.
Figure 6:
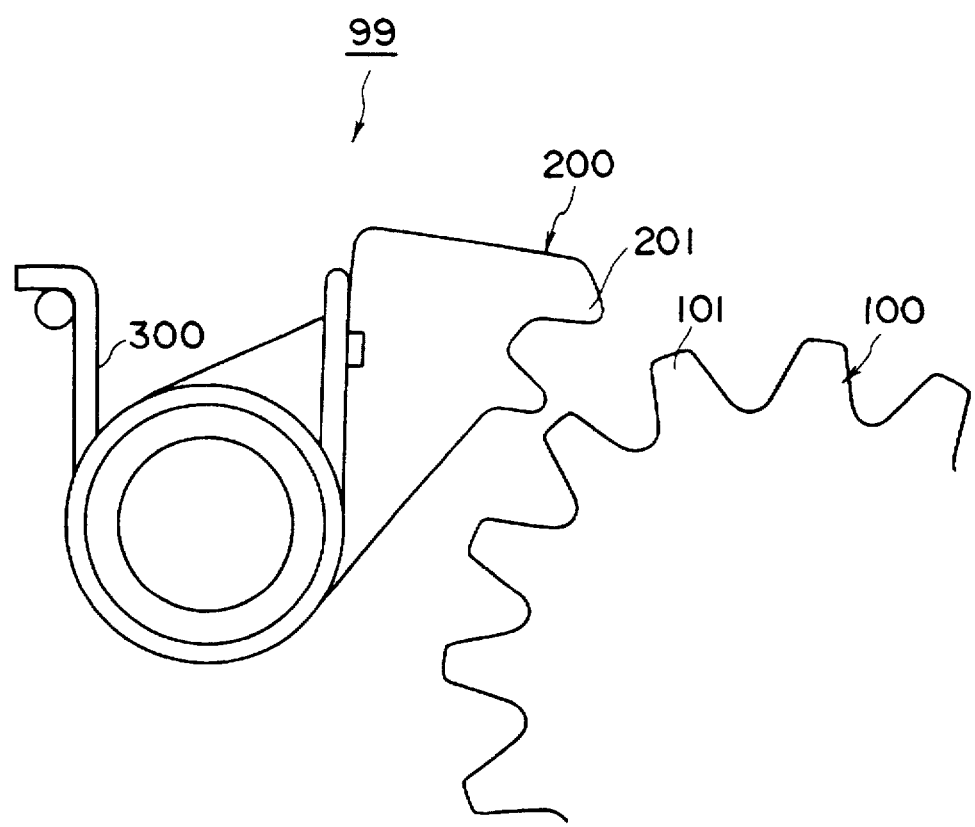
FIG. 6 is an operational view illustrating a state in which a pawl of the conventional buckle pull-out preventing device has been pushed upward by a gear.
Figure 7:
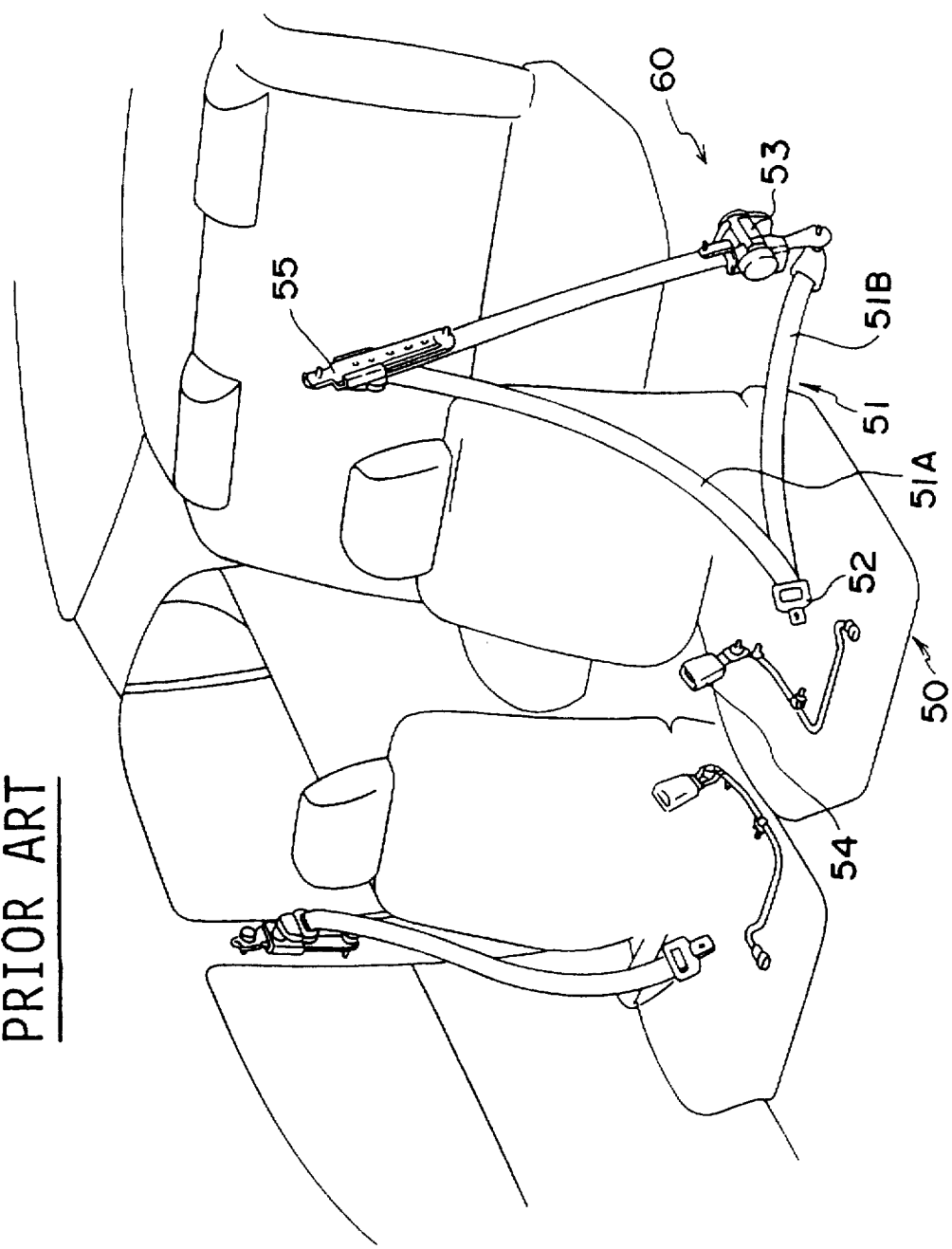
FIG. 7 is a perspective view illustrating a conventional seat belt of a vehicle.

As shown in FIG. 2, one end portion 28A of a plate spring 28 is fixed to the pawl 27 at the base portion side of the pawl 27. The end edge of another end portion 28B of the plate spring 28 usually engages a tooth surface 10B of the gear tooth 10A of the gear 10 as illustrated in FIGS. 2 and 4. The substantial center of the plate spring 28 is disposed so as to engage with an engaging portion 27C which extends further toward the base end side of the pawl 27 than the teeth 27A.

In the state illustrated in FIG. 2, the plate spring 28 urges the teeth 27A of the pawl 27 in the direction of meshing with the gear teeth 10A of the gear 10 (in the clockwise direction in FIG. 2). Further, due to the engagement of the other end portion 28B of the plate spring 28 and the gear tooth surface 10B of the gear 10, the elastic force of the plate spring 28 is transmitted to the pawl 27, and the pawl 27 pivots in synchronization with the plate spring 28.

The position of the shaft 27D of the pawl 27 and the configuration of the teeth 27A are selected such that the pawl 27 is pushed by the gear teeth 10A of the gear 10 and is pivoted counterclockwise when the wire 26 is pulled in the direction of arrow K of FIGS. 1 and 2 and the pulley 44 (the gear 10) rotates clockwise in FIG. 2 (in the direction of arrow L).

When the wire 25 is pulled in the direction opposite to arrow E and the pulley 44 (the gear 10) rotates in the counterclockwise direction, the pawl 27 is pivoted in the clockwise direction by the compressive force or the bending force which the plate spring 28 receives from the gear tooth 10A, and the teeth 27A of the pawl 27 mesh with the gear teeth 10A. In this case, the configurational dimensions of the respective parts are chosen such that, as illustrated in FIGS. 4A through 4E, when the plate spring 28 is pushed by the gear tooth 10A and the pawl 27 pivots, the teeth 27A reliably mesh with the teeth surfaces 10B of the gear teeth 10A, the teeth 27A assume positions at which they do not hit the addenda of the gear teeth 10A, and synchronicity is established.

The tension applying means of the wire 26 will now be described.

A cylinder 46 extends at a vehicle front side portion of the main body portion 41, parallel to the seat rails 45 (illustrated by the two-dotted dash line in FIG. 1) which are disposed in the substantially longitudinal direction of the vehicle. The cylindrical piston 47, which is slidable along the longitudinal direction of the cylinder 46, is disposed within the cylinder 46. As shown in FIG. 1, the other end portion of the second wire 26 is connected to the end portion of the vehicle rear end side (back surface side) of the piston 47.

An acceleration sensor 48, which senses the acceleration of the vehicle, is disposed at the top portion of the vehicle rear side end portion of the cylinder 46. A detonator 49 is provided at the vehicle rear side end portion of the acceleration sensor 48. A gas generating device 39 is installed at the vehicle rear side of the detonator 49. When the vehicle suddenly decelerates, the acceleration sensor 48 ignites the detonator 49. The gas generated by the gas generating device 39 is led to the cylinder 46, and the piston 47 moves within the cylinder 46 such that tensile force is applied to the wire 26.

The acceleration sensor 48 is formed by an inertial body, a trigger spring, a firing pin (all unillustrated) and the like. The inertial body senses the acceleration of the vehicle (the negative acceleration generated during deceleration) and inertially moves toward the front of the vehicle. The trigger spring usually urges the inertial body toward the rear of the vehicle. The firing pin is usually urged toward the detonator 49 by a firing spring. Due to the movement of the inertial body toward the front of the vehicle, the firing pin can move toward the rear of the vehicle, flying toward the detonator 49.

A booster and a gas generating material (both unillustrated) are accommodated within the gas generating device 39. Due to the ignition of the detonator 49, the sparks therefrom are guided to the booster and are converted into heat energy. Due to this heat energy, the gas generating material combusts, dissolves, and generates a large amount of gas.

A passage 46A for the gas generated by the gas generating device 39 is formed in the upper wall of the cylinder 46 at the portion at which the gas generating device 39 is disposed. As a result, the generated gas flows in a single spell into the space at the back surface side of the piston 47 of the cylinder 46 via the passage 46A. The pressure at this portion suddenly increases, and the piston 47 is thereby moved toward the front of the vehicle (in the direction of arrow K in FIG. 1).

Because the wires 25, 26 are respectively entrained about the pulley 44 (the wires 25, 26 are entrained about the pulley 44 in opposite directions), due to the piston 47 moving in the direction of arrow K along the cylinder 46, tensile forces in the directions of arrows K, E are applied to the wires 25, 26.

Next, operation of the present embodiment structured as described above will be explained.

When the vehicle decelerates normally, the inertial body which receives the vehicle acceleration and forms the acceleration sensor 48 attempts to move toward the front of the vehicle. However, because the acceleration is not very large, the original position of the inertial body is maintained. As a result, the firing pin remains in the state in which the movement thereof is prevented.

When the vehicle suddenly decelerates, the vehicle acceleration is large, and the inertial force generated in the inertial body is correspondingly large. The inertial force overcomes the urging force of the trigger spring, and the inertial body moves toward the front of the vehicle. This movement of the inertial body enables movement of the firing pin toward the detonator 49, and due to the urging force of the firing spring, the firing pin flies toward the detonator 49 and strikes the detonator 49. Due to this striking of the detonator 49, the detonator 49 ignites, and as described above, the gas generating device 39 generates a large amount of gas. The gas flows through the passage 46A, and due to the increase in pressure within the cylinder 46 at the back side of the piston 47, the piston 47 is moved in the direction of arrow K. Due to the movement of the piston 47, tensile force is applied to the wire 26. Due to the tensile force of the wire 26, the buckle 54 is moved in the pulling-in direction via the pulley 44 and the wire 25.

Next, the operation and effects of the buckle pull-out preventing device 19 will be described.

In the buckle pull-out preventing device 19 in the state illustrated in FIG. 2, when the vehicle suddenly decelerates, the second wire 26 is pulled in the direction of arrow K as described above. As a result, the teeth surfaces 10B of the gear teeth 10A push the teeth 27A of the pawl 27 and pivot the pawl 27 in the counterclockwise direction. More specifically, the teeth 27A of the pawl 27 separate from the gear teeth 10A of the gear 10. The pulley 44 (the gear 10) rotates in the clockwise direction of FIG. 2 due to the tensile force of the wire 26, and the wire 26 is wound out from the pulley 44. At the same time, the wire 25 is taken up onto the pulley 44. As a result, the buckle 54 is pulled in the direction of arrow A in FIG. 1, tension is applied to the webbing 51, and the webbing 51 is tightly applied to the vehicle occupant. Thereafter, the teeth 27A of the pawl 27 mesh with the gear teeth 10A due to the urging force of the plate spring 28. However, the teeth 27A do not hamper the rotation of the gear 10 while the gear 10 is rotating in the clockwise direction.

When the vehicle occupant pushes the webbing 51 toward the front side of the vehicle due to inertia, tensile force in the direction opposite to the direction of arrow E acts on the wire 25 via the webbing 51, and the gear 10 attempts to rotate in the counterclockwise direction in FIG. 2. As shown in FIG. 2, in the state in which the pawl 27 meshes with the gear 10, the pawl 27 prevents rotation of the gear 10 in the counterclockwise direction in FIG. 2 and functions as a ratchet. Therefore, the gear 10 does not rotate in the counterclockwise direction, and the buckle 54 is maintained in the state of being pulled-in the direction of arrow A.

As shown in FIG. 4A, when the gear 10 rotates in the counterclockwise direction in the state in which the teeth 27A of the pawl 27 are separated from the gear teeth 10A, due to the rotation of the gear 10, the other end portion 28B of the plate spring 28 which is engaged with the teeth surfaces 10B of the gear teeth 10A of the gear 10 is pushed upward by the gear teeth 10A. As a result, as illustrated in FIGS. 4B through 4E, due to the elastic force of the plate spring 28, the other end portion 28B of the plate spring 28 pivots the pawl 27 in the clockwise direction substantially synchronously with the movement of the teeth surfaces 10B of the gear 10.

As a result, even if the gear rotates in the counterclockwise direction, the pawl 27 is substantially synchronous with or in phase with the rotation of the gear 10, and the gear teeth 10A and the teeth 27A mesh as illustrated in FIG. 2. Accordingly, even if pulling-out force acts on the wire 25 (the webbing 51) due to the inertial force of the vehicle occupant, the meshed state of the gear 10 and the pawl 27 can reliably be ensured.

In the present embodiment, the first wire 25 is pulled in the pulling-in direction of the buckle 54 when the vehicle suddenly decelerates. Thereafter, even if the first wire 25 is pulled out in the pulling-out direction due to the inertial force of the vehicle occupant, substantially synchronously with the rotation of the gear 10, the plate spring 28 urges the pawl 27 in the direction of meshing between the teeth of the gear 10 (without colliding with the addenda). Therefore, the time over which the pawl 27 and the gear 10 mesh can be shortened, and the phases of the pawl 27 and the gear 10 match so that skipping of teeth can be prevented. The meshing positions of the pawl 27 and the gear 10 do not move out of place, and the pulled-in amount of the buckle 54 can be maintained.

In the above-described embodiment, an elastic body may be provided which urges the pawl 27 in the direction of meshing with the gear teeth 10A when the pawl 27 separates from the gear teeth 10A. Further, it is not necessary for the entire plate spring 28 to be an elastic body as in the above embodiment. As long as an elastic body which can maintain the plate spring 28 in the state of FIG. 2 is provided, there is no need for the plate spring 28 itself or the entire plate spring to be an elastic body.

Moreover, in the above-described embodiment, in order to transmit the drive force of the buckle pull-in device 40 from the buckle pull-in device 40 to the buckle 54, the two wires 25, 26 are used together with the first groove 22 and the second groove 23 to increase the drive stroke. However, a single wire may be connected from the detonator 49 to the buckle 54, and the intermediate portion of this wire may be entrained about the pulley 44.

What is claimed is:

1. A return preventing device preventing return, in an opposite direction, of an object driven when a vehicle suddenly decelerates, comprising:
   a rotating body rotatable in a first direction and in a second direction opposite to said first direction, said rotating body connected to a drive device for generating a drive force that rotates said body, such that when said rotating body is rotated in said first direction, said rotating body transmits the drive force to the object so as to drive the object;
   a gear connected to said rotating body and rotating integrally with said rotating body;
   a rotation-preventing pawl mounted by a pivotal mounting so as to be meshable with said gear by pivoting in a third direction for preventing rotation of said rotating body in said second direction when meshed with said gear; and
   synchronizing means for pivoting said rotation-preventing pawl in said third direction so as to make said rotation-preventing pawl mesh with said gear substantially synchronously with rotation of said rotating body in said second direction, including
   an elastic member formed from a plate spring having an end which engages teeth surfaces of said gear and pivots said rotation-preventing pawl in said third direction to make said rotation-preventing pawl mesh with teeth of said gear due to rotation of said rotating body in said second direction, wherein said plate spring circumscribes said pivotal mounting of said pawl.

2. A return preventing device according to claim 1, wherein said rotation-preventing pawl has two teeth which mesh with two adjacent teeth of said gear.

3. A return preventing device according to claim 1, wherein said gear is interposed between the object and the drive device.

4. A return preventing device according to claim 1, wherein the object is a buckle device installed in a vehicle.

5. A return preventing device according to claim 1, wherein when said rotating body rotates in said first direction, said plate spring effects pivoting of said rotation-preventing pawl in a fourth direction, which is opposite pivoting of said rotation-preventing pawl in said third direction, so as to separate said rotation-preventing pawl from said gear.

6. A return preventing device according to claim 1, wherein said plate spring of said synchronizing means urges said rotation-preventing pawl to pivot in said third direction such that said rotation-preventing pawl meshes with said gear when said rotating body rotates in said second direction.

7. A buckle pull-out preventing device installed in a buckle pull-in device for pulling-in a buckle when a vehicle suddenly decelerates, and preventing pulling-out of the buckle which has been pulled-in, comprising:
   a rotating body rotatable in a first direction and in a second direction opposite to said first direction, said rotating body connected to a drive device which generates a drive force that rotates said body in said first direction and pulls-in the buckle;
   a gear connected to said rotating body and rotating integrally with said rotating body;
   a rotation-preventing pawl pivotally mounted so as to be meshable with said gear, said rotation-preventing pawl preventing rotation of said rotating body in said second direction when said rotation-preventing pawl and said gear are meshed; and
   synchronizing means for making said rotation-preventing pawl mesh with said gear substantially synchronously with rotation of said rotating body in said second direction, including an elastic member circumscribing a pivotal mounting of said pawl having an end which engages teeth surfaces of said gear and makes said rotation-preventing pawl mesh with teeth of said gear due to rotation of said rotating body in said second direction.

8. A buckle pull-out preventing device according to claim 7, wherein said elastic member is a plate spring which is supported at said rotation-preventing pawl and which includes one end which engages the teeth surfaces of said gear.

9. A buckle pull-out preventing device according to claim 8, wherein said plate spring works to separate said rotation-preventing pawl from said gear when said rotating body rotates in said first direction.

* * * * *